ously prepared catalysts will be used as representative of the catalyst composition of this invention is shown below.

United States Patent Office
3,642,933
DOUBLE BOND ISOMERIZATION OF OLEFINS OVER ALUMINA-SUPPORTED ZIRCONIA CATALYST
Louis F. Heckelsberg, Bartlesville, Okla., assignor to Phillips Petroleum Company
No Drawing. Filed Apr. 20, 1970, Ser. No. 30,277
Int. Cl. C07c 5/22, 5/24
U.S. Cl. 260—683.2                                8 Claims

ABSTRACT OF THE DISCLOSURE

Olefins are isomerized with respect to the position of the double bond by contact with a catalyst comprising a halogen- and sulfate-free zirconium compound supported on alumina.

BACKGROUND OF THE INVENTION

Field of the invention

This invention relates to double bond isomerization of olefins using a catalyst.

Description of the prior art

A number of catalyst compositions are kown to have activity for the double bond isomerization of olefins. Such isomerization is generally carried out at relatively mild conditions of temperature to obviate undesirable side reactions such as skeletal isomerization and/or cracking. However, a good double bond isomerization catalyst having minimal skeletal isomerization, cracking or polymerization activity and which operates under the severe conditions of high temperature has utility in various hydrocarbon conversion processes. For example, a double bond isomerization catalyst which is effective at high temperatures is useful in an olefin disproportionation process at about 800° F. which employs a silica-supported tungsten oxide catalyst for the olefin disproportionation reaction. Thus, the isomerization catalyst and the disproportionation catalyst can conveniently be used either as a mixed bed or as adjacent beds within the same reactor.

Catalytic alumina has long been known to have activity for double bond isomerization. However, it is not very selective and it also results in substantial polymerization and skeletal isomerization, particularly at higher temperatures (i.e., 400° F. and higher).

OBJECTS OF THE INVENTION

It is an object of this invention to provide a catalyst for double bond isomerization of olefins at high temperatures. Other objects and advantages of the invention will be apparent from the following detailed description of the invention, examples and appended claims.

SUMMARY OF THE INVENTION

I have discovered a process for the double bond isomerization of olefin which comprises contacting a feed olefin with a catalyst comprising a suitably activated halogen- and sulfate-free zirconium compound supported on alumina at a temperature suitable for the double bond isomerization reaction. The process of the invention provides minimal skeletal isomerization products. The selectivity of the process to double bond isomers, rather than to skeletal isomers, is surprisingly high when compared with the results of an analogous process using unpromoted alumina as the catalyst.

DETAILED DESCRIPTION OF THE INVENTION

The olefins to which the invention process is applicable are those double bond isomerizable olefins such as those having from about 4 to about 20 carbon atoms per molecule. Acylic and cyclic monoolefins are presently preferred and these can be terminal or internal, and branched or unbranched. However, it is preferred that branching, if present, be at least one carbon atom removed from the double bond. Representative examples of the preferred feed olefins include butene-1, butene-2, pentene-2, 3-methylbutene-1, hexene-2, 2-ethylhexene-3, decene-4, 7,7,9,9 - tetramethyltetradecene-3, eicosene-2, and the like, and mixtures thereof.

The alumina which is used for the support material for the catalyst system of the present invention can consist of any suitable catalytic grade of alumina. Preferred aluminas are those which are active for converting olefins at relatively high temperatures, including those forms of alumina known in the art as eta and gamma alumina. The most preferred is the form of alumina known in the art as eta-alumina. Eta-alumina is conveniently produced by calcination of beta-alumina trihydrate.

The alumina-based catalyst of the present invention will contain from about 1 to about 20, preferably from about 5 to about 10, weight percent zirconium oxide based upon the weight of the total composite. The zirconium oxide can be incorporated into the alumina by any suitable means. Thus, zirconium oxide or compounds convertible to zirconium oxide upon calcination can be associated with the alumina by such means as dry mixing, wet mixing, coprecipitation, impregnation, and the like. Depending upon the contacting technique of the specific olefin process being utilized, the finished catalyst can be in any suitable form such as a powder, agglomerates, pills, extrudates, and the like.

When preparing the catalyst using compounds which are convertible to the oxide upon calcination, caution must be exercised in the selection of the zirconium compound. The use of zirconium sulfate or zirconium halides should be avoided. Although not completely understood, it is believed that some residual halogen or sulfate may become associated with the catalyst in such a manner that they cannot be removed by calcination or repeated washing of the composite. The presence of these anions increases the skeletal isomerization activity of the catalyst of the invention. In the present invention, the preferred method of preparing the catalyst comprises impregnation of catalytic grade eta-alumina with a water solution of $Zr(NO_3)_4$. Other halogen- and sulfate-free zirconium compounds such as zirconium salts of hydrocarbon carboxylic acids having from 1 to about 12 carbon atoms can also be used. Suitable examples of zirconium salts of such carboxylic acids include zirconium acetate, zirconium propionate, zirconium butyrate, zirconium laurate, and the like.

Prior to use, the catalyst composite is activated by calcination at a temperature suitable to activate the catalyst for the isomerization reaction in the presence of a flowing stream of dry activating gas. Suitable activation temperatures are in the range of from about 700 to about 1500° F., preferably from about 900 to about 1300° F. The activating gas is preferably air. Air or oxygen is necessary when the zirconium compound used in the catalyst preparation is not already in the oxide form. The time of activation can vary depending upon the activating temperature, but will generally be in the range of from about 0.1 to about 24 hours, preferably 0.5 to about 10 hours. At the completion of the activation, it is frequently desirable to flush the activated catalyst briefly with a stream of dry inert gas such as nitrogen. The procedure for regenerating a spent catalyst is essentially identical to that of activation.

According to the process of the invention, the olefinic feed to be isomerized is contacted with the suitably activated catalyst at a temperature at which the olefin undergoes double bond rearrangement, generally in the range of from about 400 to about 1200° F., preferably 700–1100° F., using any suitable contacting technique. The eta-alumina was activated in dry air at 1000° F. for 1 hour and then flushed with dry nitrogen for 10 minutes while contained in the tubular fixed bed reactor. The catalyst bed was preceded by a 5 ml. bed of glass beads as a preheat zone.

The results of the runs using the catalyst of the invention (Runs 3–5), as well as the results of the runs without zirconia (Runs 1–2), are shown in the table below.

TABLE 1.—ISOMERIZATION OF BUTENE-2

| | Run 1 | | Run 2 | | Run 3 | | Run 4 | | Run 5 | |
|---|---|---|---|---|---|---|---|---|---|---|
| Catalyst | $Al_2O_3$ | | $Al_2O_3$ | | $Al_2O_3/ZrO_2$ | | $Al_2O_3/ZrO_2$ | | $Al_2O_3/ZrO_2$ [a] | |
| Temperature, °F | 1,000 | 1,000 | 1,000 | 1,000 | 1,000 | 1,000 | 750 | 750 | 750 | 750 |
| Time on stream, minute | 10–40 | 40–70 | 10–40 | 40–70 | 10–40 | 40–70 | 10–40 | 40–70 | 10–40 | 40–70 |
| Space rate, g./g./hour | 0.9 | 1.2 | 5.9 | 6.3 | 6.2 | 5.9 | 6.6 | 5.3 | 4.8 | 4.1 |
| Pressure, p.s.i.g. | 0 | 0 | 0 | 0 | 0 | 0 | 300 | 300 | 300 | 300 |
| Effluent analysis, weight percent: | | | | | | | | | | |
| Ethylene | | | | | | | | | | |
| Propane | | | | | | | | | | |
| Propylene | 1.6 | 1.7 | 0.9 | 0.6 | | | | | 0.2 | 0.2 |
| Isobutane | 0.8 | 0.5 | Trace | Trace | | | | | | |
| n-Butane | 1.2 | 1.1 | Trace | Trace | | | | | | |
| 1-butene | 15.6 | 20.2 | 26.0 | 28.3 | 26.1 | 26.7 | 16.8 | 19.7 | 19.7 | 21.1 |
| Isobutene | 20.1 | 15.2 | 9.4 | 4.6 | 1.0 | 0.9 | 0.5 | 0.8 | 1.1 | 1.6 |
| t-2-butene | 24.6 | 30.6 | 34.3 | 34.2 | 41.9 | 41.0 | 46.2 | 46.6 | 41.5 | 43.4 |
| c-2-butene | 19.5 | 24.0 | 26.4 | 27.7 | 30.7 | 31.0 | 36.3 | 32.0 | 36.3 | 31.6 |
| $C_5+$ | 16.4 | 6.7 | 3.0 | 4.6 | 0.3 | 0.4 | 0.2 | 0.9 | 1.2 | 2.1 |

[a] Same catalyst as in previous Run 4 but regenerated in air at 1,000° F. for 1 hour followed by $N_2$ flush at 750° F.

reaction can be carried out batchwise or continuously either in the presence or absence of other inert materials or diluents. Continuous reaction such as a flow reaction through a bed of catalyst is presently preferred and can be carried out, for example, at a weight hourly space velocity in the range of from about 0.1 to about 20, preferably 5–10. The pressure of the reaction can be at any convenient level in the range of from about 0 to about 2000 p.s.i.g.

At the conclusion of the reaction, the products can be separated and isolated by any conventional means such as by fractionation, adsorption, and the like. Unconverted feed materials can be recycled through the reaction zone.

The invention is illustrated by the following examples which should not be construed as unduly limiting the scope of the invention.

EXAMPLE I

An alumina-supported zirconium oxide catalyst, containing about 5 weight percent zirconia, was prepared by impregnating 10.88 g. of catalyst grade eta-alumina with a water solution containing 3.70 g. of $Zr(NO_3)_4$. This solution was added to the 20–40 mesh eta-alumina incrementally with drying on the steam bath between the incremental addition. After the impregnation, 5.0 ml. (3.40 g.) of the composite was charged into a vertical tubular fixed bed reactor. A 5 ml. bed of glass beads was placed upstream of the catalyst bed as a preheat zone. The catalyst bed was activated at 1000° F. for 1 hour in flowing dry air followed by 10 minutes in flowing dry nitrogen.

After activation, the reactor and catalyst bed were utilized in an isomerization run wherein cis-2-butene was isomerized at atmospheric pressure and at 1000° F. The reactor effluent, for a given time on stream, was collected and later analyzed by gas-liquid chromatography. Several additional runs were made at varying conditions.

For purposes of comparison, similar runs were carried out using eta-alumina which was not promoted with zirconium oxide. In these runs, 5.0 ml. portions of 20–40

It is readily seen from examination of the table that the unpromoted eta-alumina, while active for the double bond isomerization of butene-2 to butene-1, also results in the production of the branched isobutene and heavier byproducts. In the runs showing the invention process, the skeletal isomerization to isobutene and formation of heavies (including polymer) is markedly decreased.

Reasonable variation and modifications of the invention process of double bond isomerization of olefin hydrocarbons using a catalyst of zirconium oxide supported on alumina is possible without departing from the spirit and scope thereof.

I claim:

1. A process of isomerizing a double bond isomerizable branched or unbranched acyclic monoolefin hydrocarbon having from 4 to about 20 carbon atoms per molecule which comprises contacting said olefin hydrocarbon with a calcined catalyst consisting essentially of a halogen- and sulfate-free zirconium compound on alumina at a temperature sufficient to cause double bond isomerization.

2. A process according to claim 1 wherein the zirconium compound is zirconium nitrate or a zirconium carboxylic acid having from 1 to about 12 carbon atoms per molecule.

3. A process according to claim 1 wherein the temperature is in the range of from about 400° F. to about 1200° F.

4. A process according to claim 2 wherein the zirconium compound comprises from about 1 to about 20 weight percent based on the total weight of the catalyst.

5. A process according to claim 1 wherein the monoolefin hydrocarbon is butene-2.

6. A process according to claim 1 wherein said catalyst is activated by calcination in a flowing gas at a temperature range of about 900° to about 1300° F. prior to contact with said monoolefin hydrocarbon.

7. A process according to claim 6 wherein said flowing gas is air.

8. A process according to claim 1 wherein the zirconium compound is zirconium nitrate.

(References on following page)

References Cited

UNITED STATES PATENTS

| | | | |
|---|---|---|---|
| 2,924,629 | 2/1960 | Donaldson | 260—683.2 |
| 2,428,923 | 10/1947 | Thomas et al. | 260—666 |
| 2,349,812 | 5/1944 | Day et al. | 260—683.2 |
| 2,456,672 | 12/1948 | Bloch et al. | 260—683.2 |
| 2,328,753 | 9/1943 | Thomas | 260—683.2 |
| 2,471,647 | 5/1949 | Oblad | 260—683.2 |
| 3,375,287 | 3/1968 | Tinsley et al. | 260—666 A |
| 3,217,059 | 11/1965 | Hervert et al. | 260—683.2 |
| 3,217,062 | 11/1965 | Hervert et al. | 260—683.2 |

DELBERT E. GANTZ, Primary Examiner

V. O'KEEFE, Assistant Examiner

U.S. Cl. X.R.

252—463; 260—666 A